Patented July 5, 1927.

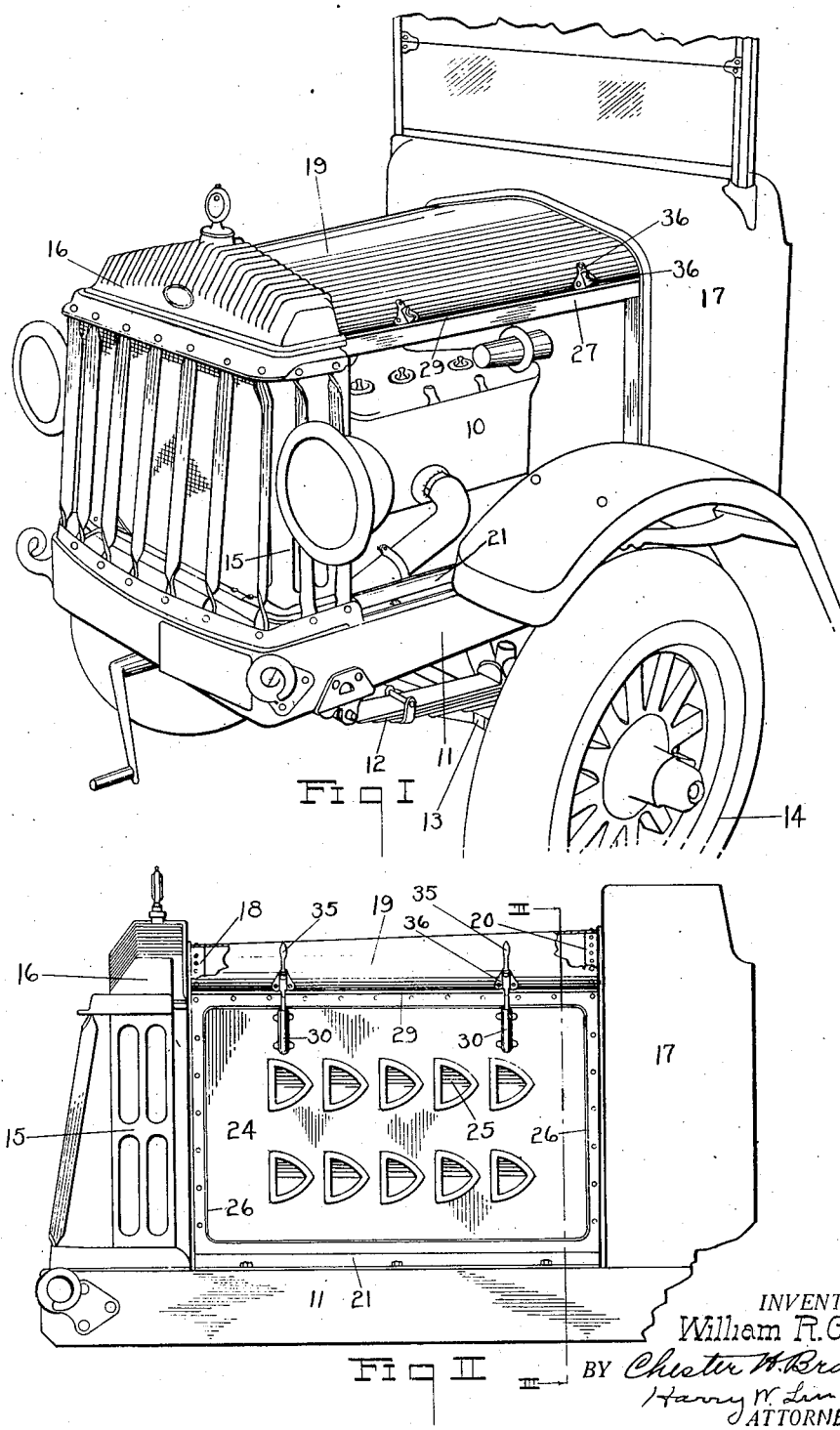

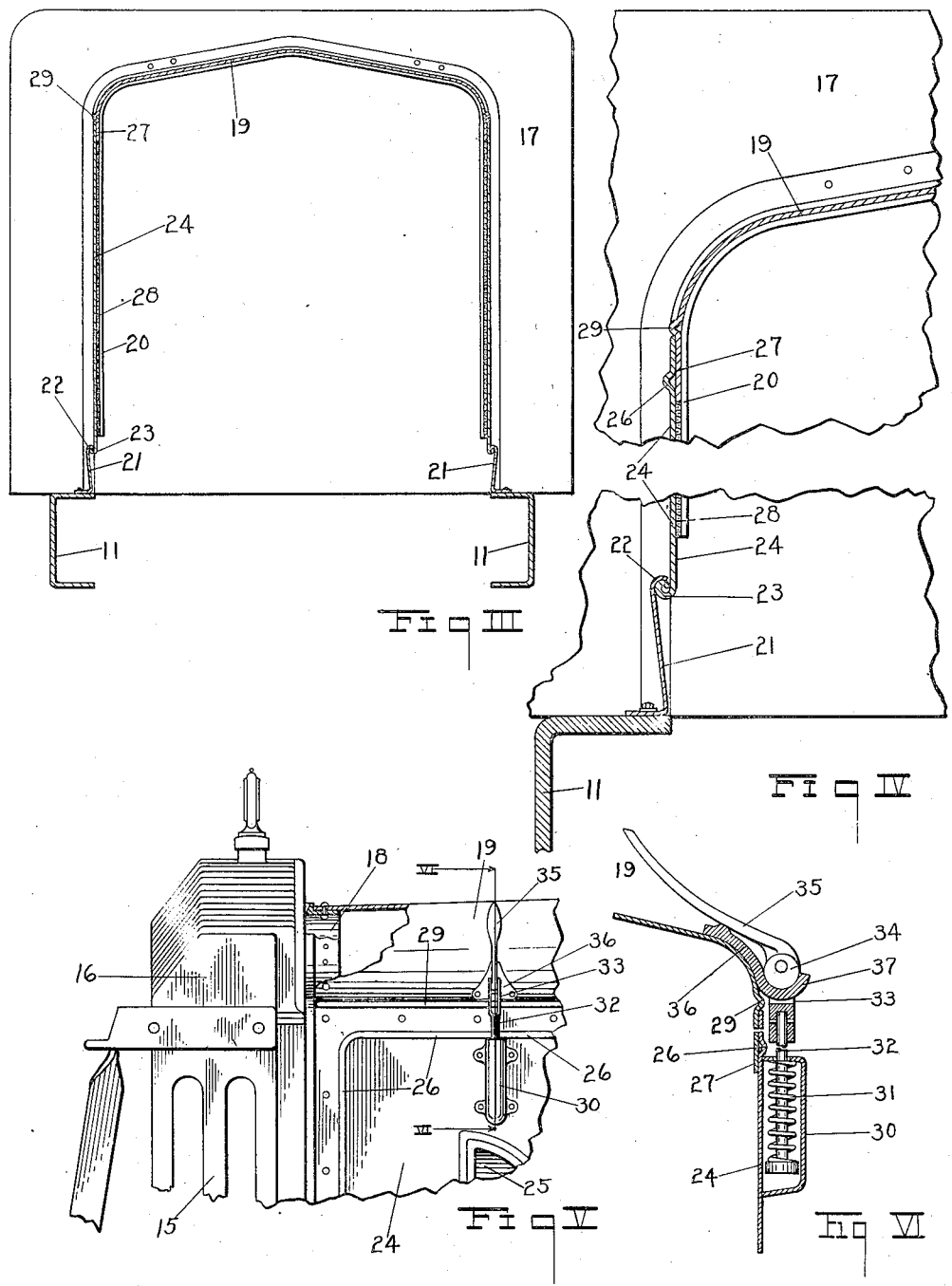

1,634,828

UNITED STATES PATENT OFFICE.

WILLIAM R. GORDON, OF TOLEDO, OHIO.

MOTOR VEHICLE.

Application filed October 25, 1920. Serial No. 419,406.

My invention relates to motor vehicles and has for its object to provide an improved engine cover or hood construction, certain portions of which are made removable to permit the engine to be exposed during warm weather, whereby it may be more effectively cooled.

A further object of the invention is to provide a hood or covering for an internal combustion engine having removable side panels with improved means for securing the panels upon the supporting structure for the engine.

A further object of the invention is to provide an improved hood or covering for the engine of a motor vehicle, one portion of which is permanently fixed with respect to the engine, and other portions thereof being quickly detachable to permit the engine to be more readily cooled.

With these and other objects in view, the invention comprises certain novel features of construction and arrangement of parts which will be hereinafter more fully pointed out and claimed, it being understood that the structure shown and described herein is susceptible of various modifications in its detailed forms of construction, and that I do not wish to be limited to the particular showing embodied in the drawings, except in so far as the same is limited by the claims appended hereunto.

One embodiment of the invention is illustrated in the accompanying drawings, in which:

Figure I is a perspective view of the front end of a motor vehicle with one of the side panels of the improved hood removed to expose the engine.
Figure II is a side elevation of the front end of the vehicle with the running gear removed.

Figure III is a transverse sectional elevation through the hood taken on line III—
III of Figure II.

Figure IV is a similar enlarged fragmentary sectional elevation.

Figure V is an enlarged fragmentary side elevation of the upper portion of the hood and radiator, with certain parts broken away to more clearly indicate the manner of connecting the top portion of the hood with the radiator casing, and Figure VI is a detailed sectional view illustrating the manner of connecting the removable side panels of the hood with the upper fixed portion thereof.

Like reference characters refer to similar ports throughout the several views of the drawings.

In the present embodiment of the invention the engine 10 is connected in any suitable manner with the side frame channels 11, the front ends of which are carried by the springs 12 on the axle 13, supported by the wheels 14 in the usual manner. A radiator 15 including the head 16 is also carried by the side frame members, and likewise the cowl 17, all of which may be of any preferred form of construction. The radiator is provided with a rearwardly extending plate member 18 with which is suitably connected the front end of the cover or roof portion 19 of the hood, the rear end of which is connected with an angle iron or flanged plate 20 extending forwardly from and connected with the cowl 17 or other suitable supporting structure. Projecting upwardly from the side frame member 11 is an outwardly inclined member 21, preferably in the form of a plate, having at its top edge a laterally extending flange 22, which is preferably turned inwardly and downwardly as indicated in Figure IV to receive the lower beaded edge 23 of the removable side panel 24 of the hood, which is provided with suitable ventilating openings as indicated at 25. The panels 24 may be stiffened and braced by any suitable means, such as the outwardly pressed rib 26 extending entirely around the panel adjacent the edge thereof. The upper edge of the panel 24 is disposed upon the downwardly extending edge 27 of the permanent cover or hood portion 19, and at its ends the removable panel is supported by the plate members 18 and 20 carried respectively by the radiator 15 and cowl 17 of the vehicle, a layer of relatively soft material 28 being interposed between the panel and said members to prevent rattling of the panel when the vehicle is in service. The downturned portion 27 of the fixed hood portion 19 is provided with an outstanding bead 29 against which the upper edge of the removable panel 24 is adapted to rest as shown in Figure IV. Secured upon the panel 24 is a casing 30 having a spring 31 disposed therein and adapted to be acted upon by a rod 32 having spaced jaws 33 at its upper end, between which is pivotally mounted a cam or eccentric 34 carrying an operating handle 35 by which the cam is rotated. Mounted upon the permanent cover portion 19 of the hood is a bracket 36 having an upstanding curved tongue or projection 37 adapted to extend between the jaws 33 of the rod 32 to receive the cam or eccentric 34, which, when moved to the position shown in Figures II, V and VI, is adapted to cause the rod 32 to compress the spring 31, whereby the beaded portion 23 of the side panel is clamped upon the flange 22 of the plate 21. The beaded portion 23 of the panel is thereby held in interlocking engagement with the plate 21, and since said plate is inclined outwardly, the panel will slide downwardly thereon when released, and at the same time the upper edge of the panel will be thrown outwardly away from the fixed portion of the hood. The operator may then readily grasp the panel and remove it from the vehicle, without having to remove or disconnect any portion of the fastening means, other than to move the handle 35 outwardly to release the tension on the spring 31.

While I have shown and described in considerable detail a specific embodiment of my invention, it is to be understood that the showing and description is illustrative only and for the purpose of rendering the invention more clear, and that I do not regard the invention as limited to the details of construction illustrated and described, nor any of them, except in so far as I have included such limitations within the meaning of the appended claims.

What I claim as new and desire to secure by Letters Patent, is:

1. In a motor vehicle, a substantially vertical hood panel normally anchored along one edge, means for releasably securing the opposite edge thereof comprising a spring tending to exert pressure on said hood panel away from its anchored edge, a cam for putting said spring under tension and an inclined plate secured to the vehicle adjacent the lower edge of said panel and positioned outwardly thereof for deflecting the lower edge of said panel inwardly when said panel is lowered from its normal position.

2. In a motor vehicle, the combination of a frame structure, a hood including a top member and a removable side panel, a plate disposed upon the frame structure and adapted to interlock with the lower edges of said panel, said plate having its inner surface adapted to contact with said panel, said inner surface having an inward slope for inwardly deflecting the lower edge of said panel when the same is lowered, means connecting the upper edge of the panel with said top member including a spring tending to yieldably raise the panel into engagement with said plate, and a cam for putting the spring under tension.

3. In a motor vehicle, the combination of a frame structure, a hood including a top member and a removable side panel, said side panel having its upper edge normally in contact with the outer surface of said top member, means disposed upon the frame structure and normally contacting with the outer surface of said panel and interlocking therewith, said means having its lower portion sloping inwardly and adapted to contact with the lower edge of said panel when the same is lowered from its normal position, and yieldable means connecting the upper edge of said panel with said top member and tending to raise the panel.

4. In a motor vehicle, the combination of a frame structure, a top member, a hood panel having its upper edge adapted to contact with the outer surface of said top member and its lower edge adapted to interlock with a portion of the frame structure, said interlocking portion being outward of said panel, said frame structure having an inclined portion below said panel for inwardly and downwardly guiding the lower edge thereof, and means co-operating with said top member for raising said panel into interlocking engagement with the frame structure.

5. In a motor vehicle, the combination of a frame structure including a radiator and a cowl, a member connecting the radiator and the cowl, a plate carried by the frame structure and provided with an inwardly extending hook portion, a panel having an outwardly projecting hook portion on its lower edge adapted to engage under the inwardly projecting portion of said plate, said plate having an inwardly inclined upstanding portion below said hood portion, means connecting the upper edge of the panel with the member connecting the radiator and cowl for yieldably tensioning said panel, and said plate being arranged to permit downward movement of said panel past said plate whereby the panel may be bodily lowered when the connecting means is released.

In testimony whereof, I affix my signature.

WILLIAM R. GORDON.